(12) United States Patent
Watanabe

(10) Patent No.: US 7,525,456 B2
(45) Date of Patent: Apr. 28, 2009

(54) METHODS FOR ADAPTIVELY SELECTING ENTROPY ENCODING MODES

(75) Inventor: Hitoshi Watanabe, San Jose, CA (US)

(73) Assignee: Qpixel Technology, Inc., Cupertino, CA (US)

(*) Notice: Subject to any disclaimer, the term of this patent is extended or adjusted under 35 U.S.C. 154(b) by 0 days.

(21) Appl. No.: 11/404,192

(22) Filed: Apr. 14, 2006

(65) Prior Publication Data

US 2006/0233260 A1 Oct. 19, 2006

Related U.S. Application Data

(60) Provisional application No. 60/671,914, filed on Apr. 15, 2005.

(51) Int. Cl.
*H03M 7/34* (2006.01)

(52) U.S. Cl. .......................... 341/51; 341/67

(58) Field of Classification Search ................. 341/106, 341/50, 51, 67, 65, 107
See application file for complete search history.

(56) References Cited

U.S. PATENT DOCUMENTS

| | | | |
|---|---|---|---|
| 6,950,040 B2 * | 9/2005 | Tsuru | 341/50 |
| 7,061,410 B1 * | 6/2006 | Pearson et al. | 341/107 |
| 7,132,964 B2 * | 11/2006 | Tsuru | 341/67 |
| 2006/0176953 A1 * | 8/2006 | Mohsenian | 375/240.03 |

* cited by examiner

Primary Examiner—Peguy JeanPierre
(74) Attorney, Agent, or Firm—Venture Pacific Law, PC

(57) ABSTRACT

The presently preferred methods of the present invention take advantage of the syntax structure of H.264 and adaptively switch the entropy coding mode between CABAC and CAVLC. In those profiles of H.264 where CABAC is supported such as the Main profile and the High profiles (HP, Hi10, Hi422, Hi444), the entropy coding mode to be used is specified via a picture parameter set ("PPS"), where a particular PPS is specified for each slice in its header ("slice header"). The encoders of the present invention provide a multiple-PPS for both the CAVLC and CABAC, so that bitstreams are produced by both CAVLC and CABAC. CAVLC, having a simpler algorithm structure, is implemented as a part of the video pipe, where each single video pipe stage is designed to operate within a pre-defined number of clock cycles. The video pipe generates SE at pre-scheduled instances buffered in FIFO. The SE serves as input to CABAC, where CABAC encodes the SE in an event-driven fashion. During this process, CABAC is monitored to determine if the CABAC engine is able to keep up with the video pipe. The video pipe, implemented using CAVLC, by design will complete the encoding process within the allotted time. However, CABAC, although having better encoding efficiency and where its generated output is more desirable, its encoding completion time is uncertain and may require more time than it is allowed. Thus if CABAC cannot complete the encoding process within the allotted time, the bitstream generated by CABAC would not be complete and it cannot be used. If CABAC can complete the encoding process within the allotted time, the CABAC engine would be allowed to complete the encoding process and its generated output would be used as the bitstream of choice.

22 Claims, 3 Drawing Sheets

METHODS FOR ADAPTIVELY SELECTING ENTROPY ENCODING MODES

CROSS REFERENCE

This application claims priority from a provisional United States application entitled "Methods for Adaptively Selecting Entropy Encoding Mode" filed on Apr. 15, 2005, having a U.S. Application No. 60/671,914. This application is incorporated herein by reference in its entirety.

FIELD OF INVENTION

This invention relates to an encoding method for digital video images, and, in particular, a real-time adaptive selection of encoding methods for digital video compression algorithms.

BACKGROUND

H.264 video compression standard provides two distinctive entropy coding methods to encode syntax elements, namely, Content Adaptive Binary Arithmetic Coding (CABAC, hereafter) and Content Adaptive Variable Length Coding (CAVLC, hereafter). It has been verified that CABAC generally provides superior coding efficiency over CAVLC due to its better content adaptive nature.

However, CABAC has a heavily sequential algorithm structure rendering it difficult to implement in a parallel fashion. Therefore, the total number of clocks required for encoding syntax elements ("SE") for a single block unit (a "macroblock") or a single slice can fluctuate wildly depending on the nature of raw video sequence and are therefore difficult to maintain within a well-defined limit.

The above properties of CABAC not only necessitate an ultra-fast processor for a real-time encoding on PC/DSP platforms, but also become a major obstacle for low-power implementation of H.264 on ASIC which is critical for consumer electronics applications. The present invention presented herein overcomes such obstacle by presenting novel methods for utilizing encoding methods in an efficient manner.

Note that the terminologies used herein may also be found and further specified in the H.264 documentation (JVT-N050d1).

SUMMARY OF INVENTION

An object of the present invention is to provide better encoding efficiency while conforming to industry standard video compression methods.

Another object of the present invention is to provide better image output while conforming to industry standard video compression methods.

Yet another object of the present invention is to provide methods allowing low-power encoding of images while conforming to industry standard video compression methods.

Briefly, the encoders of the present invention provide a multiple-PPS for both the CAVLC and CABAC, so that bitstreams are produced by both CAVLC and CABAC. CAVLC is implemented as a part of the video pipe, where each single video pipe stage is designed to operate within a pre-defined number of clock cycles. The video pipe generates SE at pre-scheduled instances buffered in FIFO. The SE serves as input to CABAC, where CABAC encodes the SE in an event-driven fashion. During this process, CABAC is monitored to determine if the CABAC engine is able to keep up with the video pipe. The video pipe, implemented using CAVLC, by design will complete the encoding process within the allotted time. However, CABAC, although having better encoding efficiency and where its generated output is more desirable, its encoding completion time is uncertain and may require more time than it is allowed. Thus if CABAC cannot complete the encoding process within the allotted time, the bitstream generated by CABAC would not be complete and it cannot be used. However, if CABAC can complete the encoding process within the allotted time, the CABAC engine would be allowed to complete the encoding process and its generated output would be used as the bitstream of choice.

An advantage of the present invention is that it provides better encoding efficiency while conforming to industry standard video compression methods.

Another advantage of the present invention is that it provides better image output while conforming to industry standard video compression methods.

Yet another advantage of the present invention is that it provides methods allowing low-power encoding of images while conforming to industry standard video compression methods.

FIGURES

The following are further descriptions of the invention with references to figures and examples of their applications.

DETAILED DESCRIPTION OF THE PREFERRED EMBODIMENTS

Figure 1A:
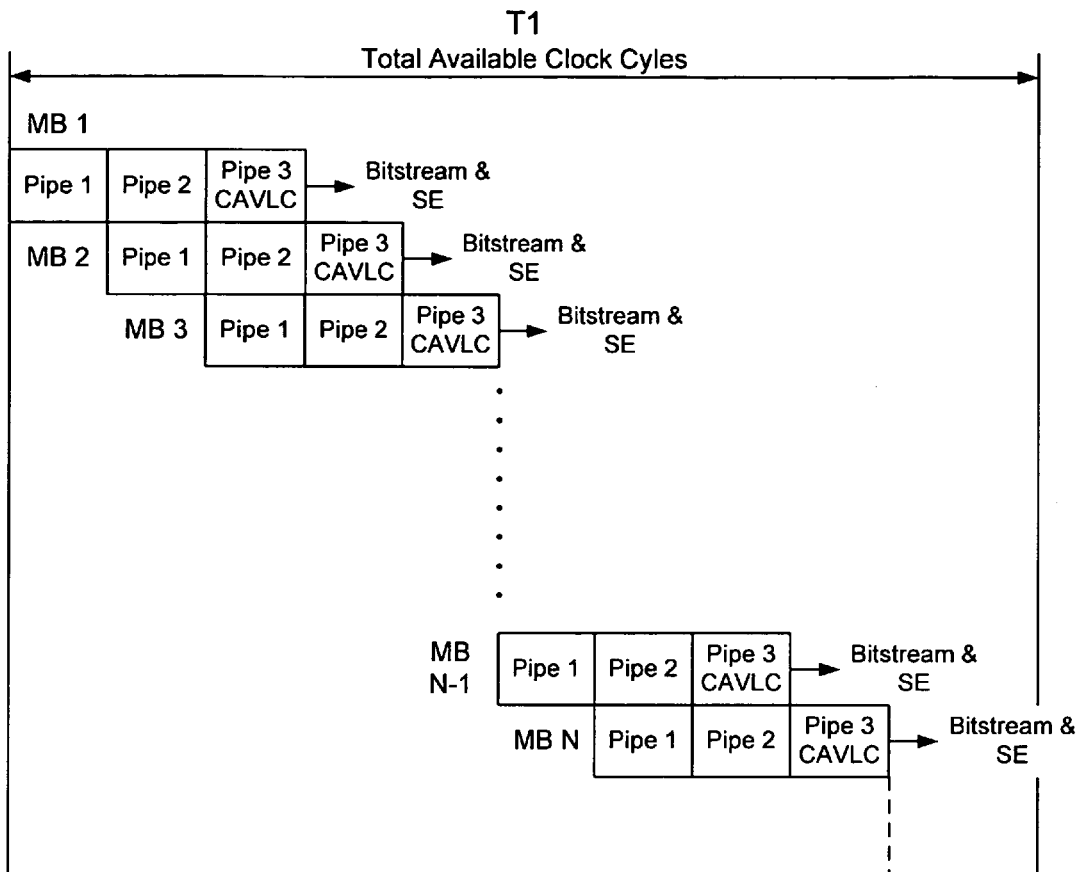
FIG. 1A illustrates a video pipe having three pipeline stages in which CAVLC is invoked in stage 3.

The presently preferred methods of the present invention take advantage of the syntax structure of H.264 and adaptively switch the entropy coding mode between CABAC and CAVLC. In those profiles of H.264 where CABAC is supported such as the Main profile and the High profiles (HP, Hi10, Hi422, Hi444), the entropy coding mode to be used is specified via a picture parameter set ("PPS"), where a particular PPS is specified for each slice in its header ("slice header"). In the presently preferred embodiment of the present invention, the encoders of the present invention provide a multiple-PPS for both the CAVLC and CABAC, so that bitstreams are produced by both CAVLC and CABAC. CAVLC, having a simpler algorithm structure, is implemented as a part of the video pipe, where each single video pipe stage is designed to operate within a pre-defined number of clock cycles. The video pipe generates SE at pre-scheduled instances buffered in FIFO. The SE serves as input to CABAC, where CABAC encodes the SE in an event-driven fashion. During this process, CABAC is monitored to determine if the CABAC engine is able to keep up with the video pipe.

The video pipe, implemented using CAVLC, by design will complete the encoding process within the allotted time. However, CABAC, although having better encoding efficiency and where its generated output is more desirable, its encoding completion time is uncertain and may require more time than it is allowed. Thus if CABAC cannot complete the encoding process within the allotted time, the bitstream generated by CABAC would not be complete and it cannot be used. However, if CABAC can complete the encoding process within the allotted time, the CABAC engine would be allowed to complete the encoding process and its generated output would be used as the bitstream of choice.

Thus, the CABAC is monitored to determine if the CABAC engine is keeping up with the encoding process of the video pipe (in its processing of the SE). The monitoring is implemented by distributing checkpoints at certain point(s) of the time cycle, where the coarser the distribution of the checkpoints, the worse of the latency. Index to the picture parameter set corresponding to each entropy coding mode is encoded in the slice header portion of bitstream for each slice.

In one embodiment, a checkpoint is placed at the end of each slice. In this case, it is guaranteed that the encoding of all SE for each slice is finished and a complete bitstream for each slice is available within the number of clocks pre-allocated for each slice. Therefore, the buffering of the input SE for CABAC as well as the output bitstream from CABAC while encoding is required for only one slice and latency will be kept to less than one slice.

In another embodiment, a check point is placed at the end of a group of slices. In this case, the encoder buffers the bitstreams for multiple slices and determines which entropy mode to use at the end of the group of slices. Many variations of the embodiment of the present invention are possible.

Referring to FIG. 1A, a presently preferred embodiment of the present invention, an implementation of a video pipe shown on a time axis, is illustrated. In the processing of a slice, a slice is divided into a number of macroblocks ("MB") from 1 to N. The video pipe processes each macroblock accordingly in three pipes: Pipe1, Pipe2 and Pipe3. Pipe1 and Pipe2 are preprocessing pipes allowing the generation of SE in Pipe3 where Pipe3 implements the CAVLC encoding process. The CAVLC encodes said SE and generates bitstreams as output during the pipe3 stage. N is a total number of MBs in each slice. T1 is a total number of clock cycles allocated for a slice. T2 indicates the progress of the CABAC encoding process in encoding the SEs for the current slice. Tx is a checkpoint. The CABAC also encodes said SE and generates bitstream as output. The total clock cycles or maximum clock cycles (indicated by "T1") for the processing of one slice in a video pipeline (MB1 to MBN) is generally dictated by the relevant standards or the relevant design strategy. Note that the number of pipe stages depends on the architecture design and is not limited to 3. Note also that how a generation of SE takes place during the video pipe and how to integrate CAVLC into the video pipe depend on the architecture design as well and are not limited to the embodiments described herein.

Note that the selection of a best mode for the encoding process may involve a calculation of the bit-cost for a particular prediction mode candidate, and in this case, the CAVLC is used to calculate bit-cost in order to control the cycle counts required for the selection of a best mode during the video pipeline.

Figure 1B:
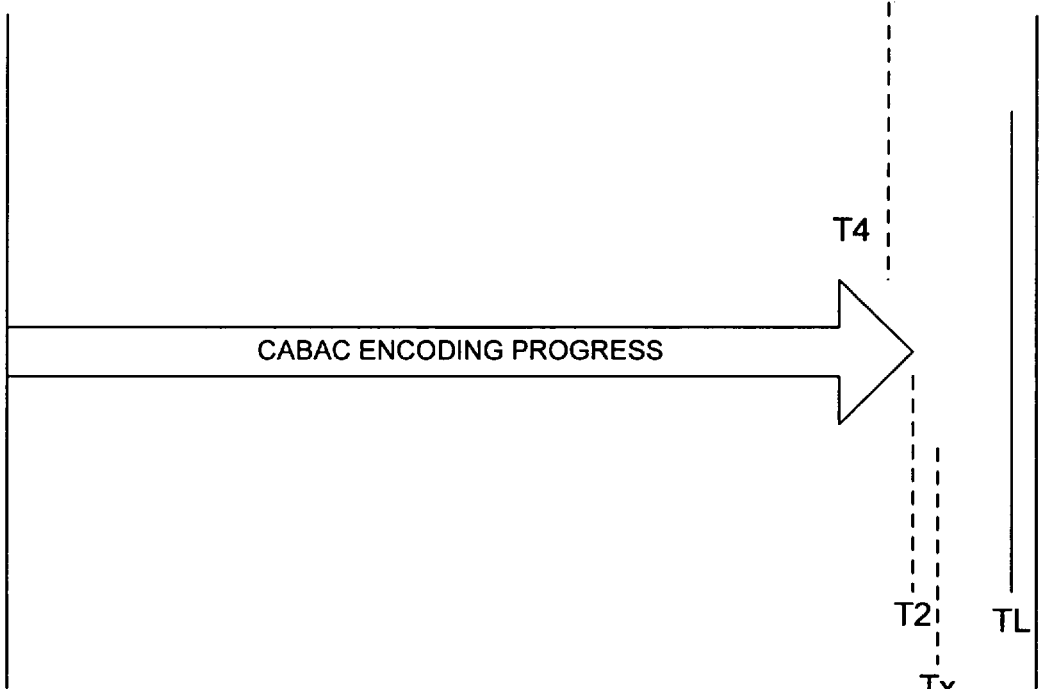
FIG. 1B illustrates a video CABAC encoding progress at various time points.

Referring to FIG. 1B, the progress of the CABAC encoding process is illustrated with respect to time. T2 illustrates the current clock time. T4 is the time where the last SE has been generated by the CAVLC engine but before the overall encoding process is complete. Tx is a checkpoint after T4 and there can be several checkpoints after T4. TL is the last checkpoint, and generally speaking, TL is T1 less CABAC post-processing time.

By monitoring the progress of CABAC at the various checkpoints Tx, whether CABAC can complete its process by time T1 can be determined. If CABAC can complete by T1, its bitstream is sent out and the CAVLC-generated bitstream would not be used. If CABAC cannot complete by T1, the CAVLC-generated bitstream would be send out.

The number of checkpoints Tx, and the distribution of these checkpoints Tx, would determine the granularity and the latency in the monitoring process.

In the above described process, a rate control scheme to adjust the quantization parameters for each macroblock is done based on the bits calculated based on CAVLC. If a CABAC bitstream is chosen at the end of a slice, the CABAC bit count is used to update the total bit count for a given slice.

Figure 2:
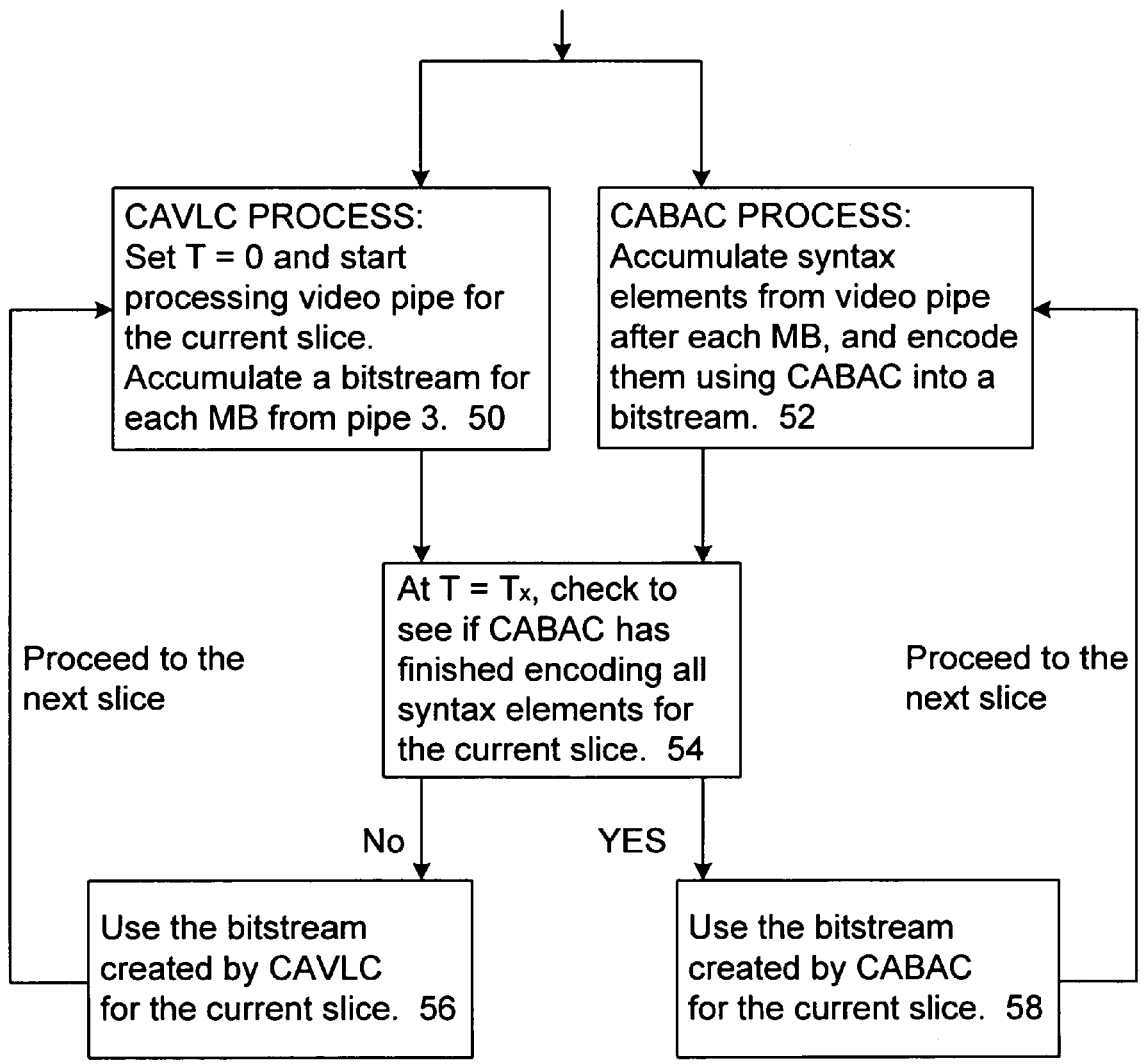
FIG. 2 is a flow chart for pack bitstreams where a checkpoint for decision making of entropy mode is placed at the end of each slice.

FIG. 2 illustrates a flow chart showing the decision process in selecting an entropy encoding mode. At the beginning of the process, both the CAVLC process as well as the CABAC process are started. In the CAVLC process, 50, T is set to 0 and a slice is divided into a number of MBs and each MB is processed and at each pipe3 stage, a bitstream is generated as output and a SE is generated for the CABAC engine. In the CABAC process, 52, the SE generated by the video pipe for each MB is used as input by the CABAC process. The CABAC process encodes the SE into a bitstream as the CABAC output. At T=Tx and TL (Tx is one or more checkpoints and TL is the last checkpoint), the CABAC encoding progress is checked to determine if the CABAC process is complete 54. If the CABAC encoding process is completed, the CABAC output is selected as the final output 56. If the CABAC encoding process is not completed, the CAVLC output is selected as the final output 58. Then, the next slice is processed in a similar fashion.

Figure 3:
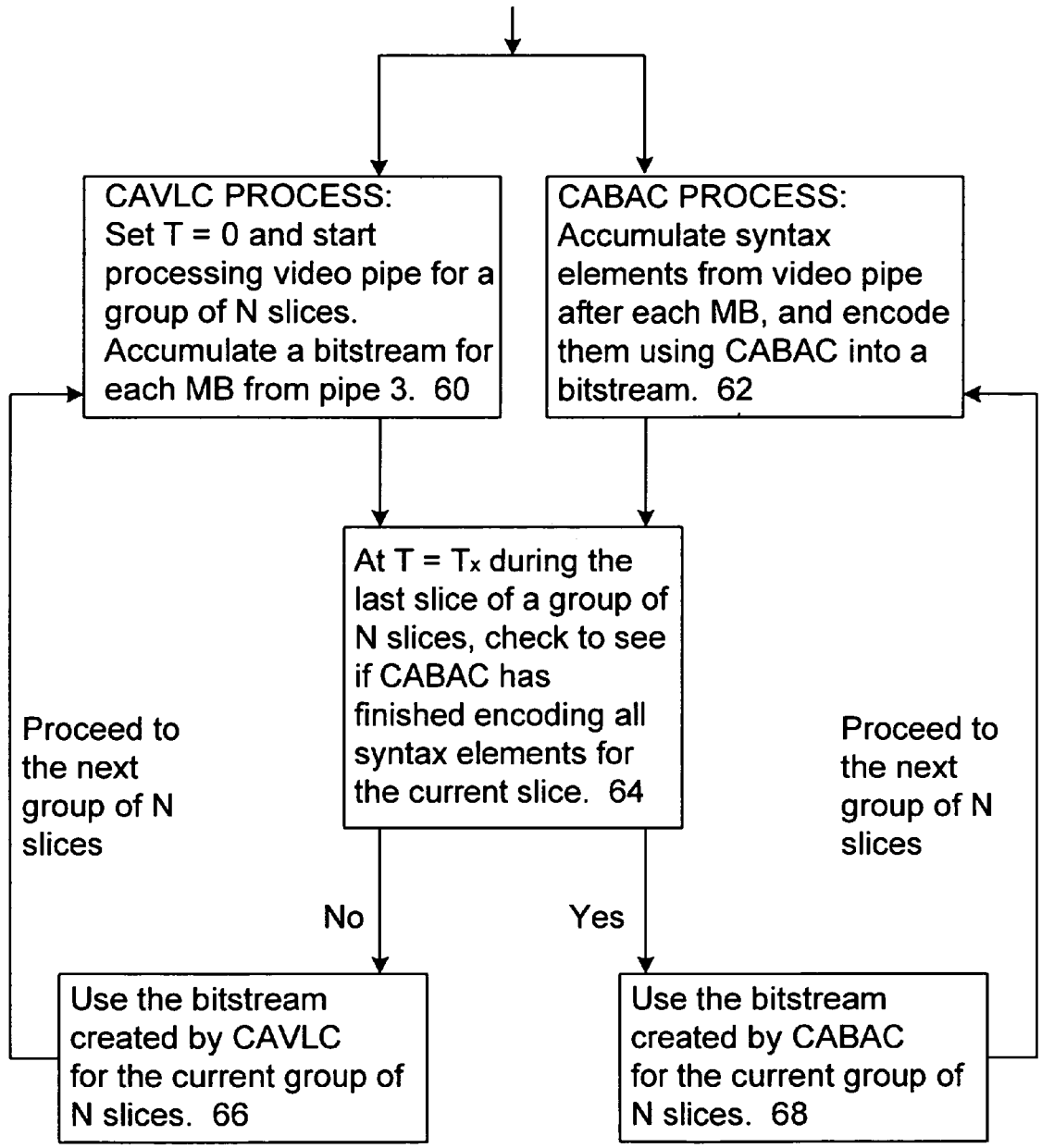
FIG. 3 is a flow chart of a procedure to pack bitstreams where a checkpoint for decision making of entropy mode is placed at the end of a group of N slices.

FIG. 3 illustrates a flow chart showing the decision process, similar to FIG. 2, in selecting an entropy mode but for a group of slices. At the beginning of the process, both the CAVLC process as well as the CABAC process are started. In the CAVLC process, 60, T is set to 0 and a group of slices are divided into a number of MBs and each MB is processed. At each pipe3 stage, a bitstream is generated by CAVLC as output and a SE is generated for the CABAC engine. In the CABAC process, 62, the SE generated by the video pipe for each MB is used as input by the CABAC process. The CABAC process encodes the SE into a bitstream as the CABAC output. At T=Tx and TL (Tx is one or more checkpoints and TL is the last checkpoint), the CABAC encoding progress is checked to determine if the CABAC process is complete 64. If the CABAC encoding process is completed, the CABAC output is selected as the final output 66. If the CABAC encoding process is not completed, the CAVLC output is selected as the final output 68. Then, the next group of slices is processed in a similar fashion.

Note that in processing a group of slices, checkpoints are not required at every slice. Checkpoints can be placed at every so-many slices to monitor the processing of the slices. If it is determined that CABAC processing cannot be completed in time, this process can be terminated early (in order to reduce power). One or more checkpoints can also be placed in the last slice of the group in order to determine final status of the CABAC process.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but all those other and further alterations and modifications as would be apparent to those of ordinary skilled in the art.

I claim:

1. A method for adaptively selecting an entropy encoding output, comprising the steps of:
    predefining a maximum clock cycles for the encoding of one or more slices;
    processing the one or more slices using a first encoding process, wherein said first encoding process generates a first bitstream for the slice, and wherein said first encoding process completes processing of the one or more slices within said maximum clock cycles;
    processing the one or more slices using a second encoding process and generating a second bitstream; and
    if said second encoding completes processing within said maximum clock cycles,
        selecting said second bitstream as the encoding output; else
        selecting said first bitstream as the encoding output.

2. The method of claim 1 wherein said first encoding process is the CAVLC process.

3. The method of claim 2 wherein said second encoding process is the CABAC process.

4. The method of claim 1 wherein said second encoding process is the CABAC process.

5. The method of claim 4 wherein one or more checkpoints are used to monitor the progress of the CABAC process.

6. The method of claim 5 wherein the last checkpoint is place in the last slice at a point in time that is a unit of CABAC post-processing time before the maximum clock cycle time.

7. The method of claim 1 wherein each of the slices is divided into one or more macroblocks and a syntax element is generated for each of the macroblocks; and the bitstreams are generated from the macroblocks.

8. The method of claim 7 wherein rate control is performed based on the bits calculated using CAVLC.

9. A method for adaptively selecting an entropy encoding output, comprising the steps of:
    predefining a maximum clock cycles for the encoding of one or more slices;
    dividing the one or more slices into one or more macroblocks;
    generating a syntax element for each of the macroblocks;
    processing the syntax element for each macroblock using a first encoding process, wherein said first encoding process generates a first bitstream for each macroblock, and wherein said first encoding process completes processing of the slices within said maximum clock cycles;
    processing each of the syntax element using a second encoding process and generating a second bitstream; and
    if said second encoding completes processing within said maximum clock cycles,
        selecting said second bitstream as the encoding output; else
        selecting said first bitstream as the encoding output.

10. The method of claim 9 wherein said first encoding process is the CAVLC process.

11. The method of claim 10 wherein said second encoding process is the CABAC process.

12. The method of claim 10 wherein rate control is performed based on the bits calculated using CAVLC.

13. The method of claim 9 wherein said second encoding process is the CABAC process.

14. The method of claim 13 wherein one or more checkpoints are used to monitor the progress of the CABAC process.

15. The method of claim 14 wherein the last checkpoint is place in the last slice at a point in time that is a unit of CABAC post-processing time before the maximum clock cycle time.

16. A method for adaptively selecting an entropy encoding output, comprising the steps of:
    predefining a maximum clock cycles for the encoding of one or more slices;
    dividing the slices into one or more macroblocks;
    encoding multiple picture parameter sets for a first encoding process and a second encoding process;
    generating a syntax element for each macroblock;
    processing said syntax element for each macroblock using a first encoding process, wherein said first encoding process generates a first bitstream for each macroblock, and wherein said first encoding process completes processing of the slices within said maximum clock cycles;
    processing each of the syntax element using a second encoding process and generating a second bitstream;
    selecting said second bitstream containing as the encoding output if said second encoding process completes processing within said maximum clock cycles, wherein said second bitstream contains the index to a picture parameter set corresponding to said second encoding process;
    selecting said first bitstream as the encoding output if said second encoding cannot complete processing within said maximum clock cycles, wherein said first bitstream contains the index to a picture parameter set corresponding to said first encoding process;
    if a bits count is required for processing of each macroblock, using a bits count of the bitstream generated by said first encoding process; and
    recording the bits count for a given slice using the size of the selected bitstream for said slice.

17. The method of claim 16 wherein said first encoding process is the CAVLC process.

18. The method of claim 17 wherein said second encoding process is the CABAC process.

19. The method of claim 17 wherein rate control is performed based on the bits calculated using CAVLC.

20. The method of claim 16 wherein said second encoding process is the CABAC process.

21. The method of claim 20 wherein one or more checkpoints are used to monitor the progress of the CABAC process.

22. The method of claim 21 wherein the last checkpoint is place in the last slice at a point in time that is a unit of CABAC post-processing time before the maximum clock cycle time.

* * * * *